United States Patent [19]
Deml et al.

[11] 3,771,771
[45] Nov. 13, 1973

[54] APPARATUS PREPARING A MIXTURE FOR BONDING GRANULES OF VEGETABLE ORIGIN

[75] Inventors: Miroslav Deml, Frydek-Mistek; Jaroslav Limberg, Praha, both of Czechoslovakia

[73] Assignee: Hutni Projekt Praha, Projekoni Inzenyrska organizace, Ostrava, Czechoslovakia

[22] Filed: June 23, 1972

[21] Appl. No.: 265,805

[52] U.S. Cl. .................................................. 259/8
[51] Int. Cl. ............................................... B01f 7/06
[58] Field of Search ...................... 259/4, 5, 6, 7, 8, 259/9, 10, 61, 64, 65, 66, 67, 19, 23, 24, 41, 42, 43, 44

[56] References Cited
UNITED STATES PATENTS

| | | |
|---|---|---|
| 3,120,377 | 2/1964 | Lipschultz.............................. 259/4 |
| 3,123,342 | 3/1964 | Little ..................................... 259/4 |
| 3,265,365 | 8/1966 | Ward ..................................... 259/8 |
| 3,424,439 | 1/1969 | Baker..................................... 259/4 |

*Primary Examiner*—Robert W. Jenkins
*Attorney*—Arthur O. Klein

[57] ABSTRACT

An apparatus for the preparation of binding mixture to be applied to granules of vegetable origin, in the fabrication of panels or of shaped elements for building purposes. The apparatus comprises a hardener stirring vessel provided with a vertical pump connected to a graduated hardener vessel and a binding mixture mixer which binding mixture mixer is connected to a binding mixture repumping pump connected on its turn with a binding mixture storage tank. The storage tank is connected through a filter with a binding mixture variable controlled-volume pump, the said binding mixture controlled-volume pump being connected to the injection jets of a binding mixture applicator for the application of binding mixture onto granules of vegetable origin.

3 Claims, 1 Drawing Figure

PATENTED NOV 13 1973 3,771,771
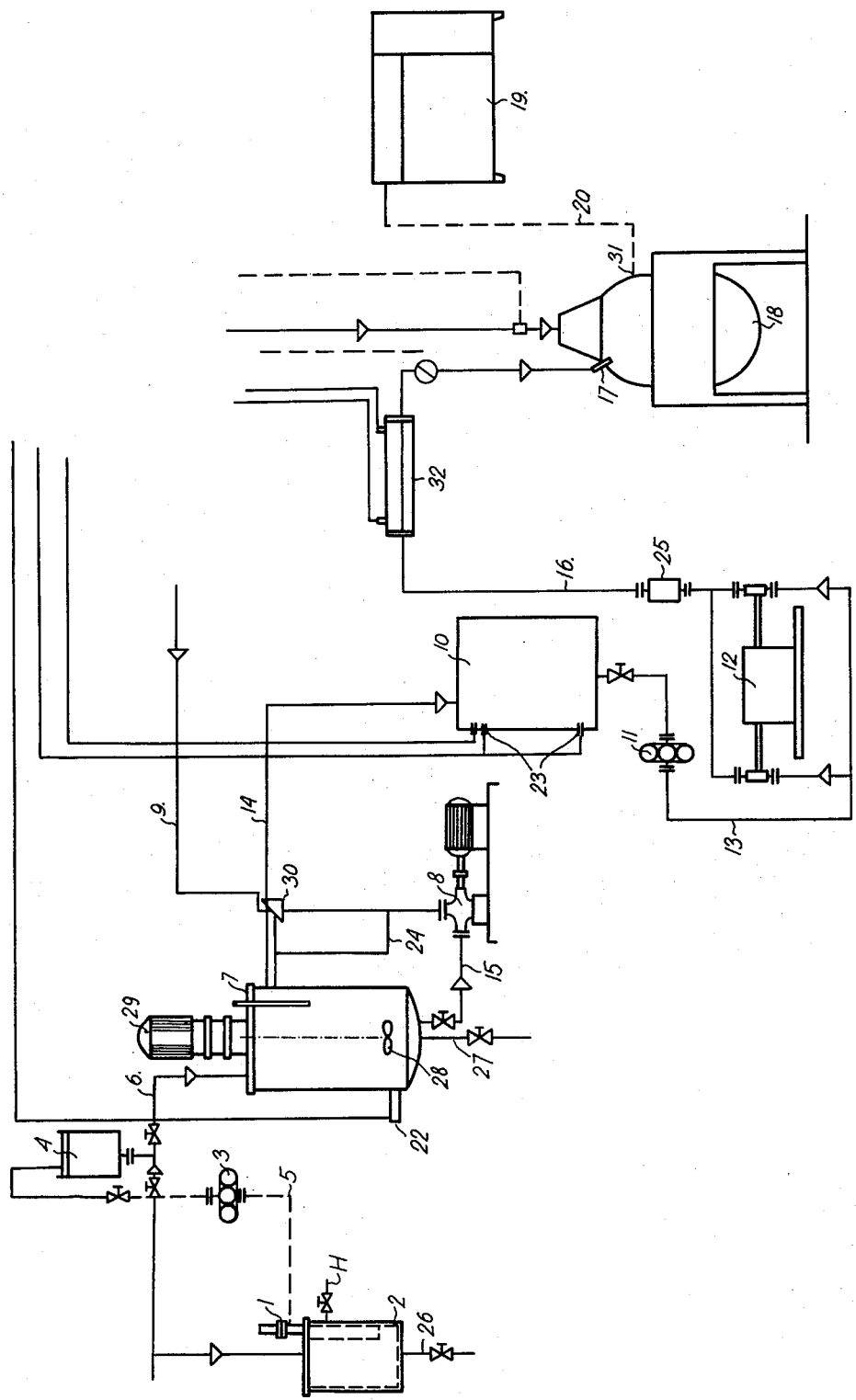

APPARATUS PREPARING A MIXTURE FOR BONDING GRANULES OF VEGETABLE ORIGIN

The present invention relates to an equipment or apparatus for the preparation of a binding mixture to be applied to granules of vegetable origin, especially granules made from stemmed corn ears, in the fabrication of plates or of shaped elements for building purposes, hereinafter spoken as plates, by the pressing of the mixtures so prepared.

Up until now, the binding mixture to be applied to granules made from stemmed corn ears in the fabrication of plates for building purposes has been prepared by feeding the adhesive by hand into the pan of an electric whipping device where it becomes intimately mixed with a hardener which had been dissolved in water and is being continuously added to the adhesive, after which the binding mixture is reladled into a vessel from which it is carried by hand to an applicator where the granules from stemmed corn ears are sprayed with the binding mixture.

There is also known the spraying of granules with a binding mixture through nozzles installed in the applicator to which the binding mixture is fed by a gearwheel pump located in the vessel containing the binding mixture.

The hitherto known equipments for the preparation of binding mixtures are disadvantageous in that they do not make possible possible the automation of production because of the very considerable amount of manual work involved, and in their making it impossible to keep the right proportions of granules and binding mixture; this obviously unfavorably affects the quality of the products.

The said disadvantages of the hitherto known equipments for the preparation of binding mixtures are overcome by the equipment according to the present invention. In accordance with the invention the equipment comprises hardener mixing vessel with a vertical pump, this pump is connected, by way of a hardener filter to a graduated hardener vessel, and the graduated hardener vessel is connected to a binding mixture mixer joined to a binding mixture repumping pump connected with a binding mixture storage tank, which tank, in its turn, is connected through a filter with a binding mixture controlled-volume pump, this volume pump being connected to the injection jets of a binding mixture applicator.

The advantage of the equipment according to the invention resides in its making possible the automation of the production of plates from granules of vegetable origin, especially from granules made from stemmed corn ears, in favorably affecting the quality of the finished products, and in producing a reduction in the amount of manual work required which renders plate production more economical.

The equipment according to the present invention is shown, by way of example, in the annexed drawing.

The sole FIGURE of the drawing is a schematic view in side elevation of a preferred illustrative embodiment of apparatus in accordance with the invention.

The apparatus shown comprises a hardener stirring vessel 2 provided with a vertical pump 1 connected to a graduated hardener vessel 4 by a piping 5 through a hardener filter 3. The graduated hardener vessel 4 is connected by a piping 6 to a binding mixture mixer 7 into which the adhesive is fed by a piping directly from the corresponding storage tank, and the hardener is fed by the piping 6 of the graduated vessel 4. The binding mixture mixer 7 is connected to a binding mixture repumping pump 8 which is connected by a piping 14 to a binding mixture storage tank 10. This tank 10 is connected through a filter 11 by a piping 13 to a binding mixture variable controlled-volume pump 12, connected on its turn by a piping 16 to the injection jets 17 of a binding mixture applicator 18.

To the applicator 18 there is further connected, by a piping 20, a paraffin feeding device 19. The binding mixture mixer 7 and the binding mixture storage tank 10, are each provided with a high-low level alarm 22, 23. The piping 14, which connects the binding mixture mixer 7 to the binding mixture storage 10, is connected by a return piping 24 to the binding mixture mixer 7.

In the piping 16, which connects the binding mixture controlled-volume pump 12 to the injection jets 17 of the binding mixture applicator 18 there is installed a fan 25 and a binding mixture flow indicator 32. The hardener stirring vessel 2 and the binding mixture mixer 7 are each provided with drain piping 26, 27.

The stirring of the hardener in the stirring vessel 2 is carried out by compressed air fed into the stirring vessel 2 by a rubber hose H. The well stirred hardener is repumped into the graduated hardener vessel 4 by the vertical pump 1. In the graduated vessel 4, the necessary amounts of hardener are gauged to be fed into the binding mixture mixer 7. The binding mixture, which consists of adhesive and hardener, is stirred in the mixer 7 by a propeller stirrer 28 driven by an electric motor 29 with gear box located on the lid of the binding mixture mixer 7. The amounts of adhesive to be fed into the binding mixture mixer 7 through the piping 9 are checked by the level alarm 22.

The binding mixture is repumped out of the mixer 7 into the binding storage tank 10 by the repumping pump 8. The piping 14 which connects the repumping pump 8 to the binding mixture storage tank 10, is provided with pneumatic closing valves 30 which control the inlet of binding mixture into the binding mixture storage tank or tanks 10. These closing valves 30 are controlled by the level control and alarms 23 in the binding mixture storage tank 10. Since the piping 14, which connects the binding mixture mixer 7 to the binding mixture storage tank 10, is connected by the return piping 24 to the binding mixture mixer 7, it is possible to keep the repumping pump 8 in constant operation.

The binding mixture is conveyed out of the storage tank 10 by gravity through the filter 11 to the binding mixture variable controlled-volume pump 12 which feeds the binding mixture to the injection jets 17 of the binding mixture applicator 18 through the fan 25 and the flow indicator 32. In addition to the binding mixture injection jets 17, there are installed in the binding mixture applicator 18 a set of nozzles 31 for supplying, from the paraffin feeding device 19, the paraffin to be applied together with the bindung mixture onto the granules.

Although the invention is illustrated and described with reference to one preferred embodiment thereof, it is to be expressly understood that it is in no way limited to the disclosure of such a preferred embodiment, but is capable of numerous modifications within the scope of the appended claims.

We claim:

1. Apparatus for the preparation of a binding mixture to be applied to granules of vegetable origin in the fabrication of panels or of shaped elements for building purposes, comprising a hardener stirring vessel provided with a first pump connected to a graduated containing vessel and a binding mixture mixer, the binding mixture mixer being connected to a binding mixture storage tank through a second, binding mixture re-pumping pump, the said binding mixture storage tank being connected to a third, binding mixture pump through a filter, the said binding mixture pump being connected to injection jets of a binding mixture applicator for the application of the binding mixture to granules of vegetable origin.

2. Apparatus according to claim 1, wherein the pump with which the hardener stirring vessel is provided is disposed vertical.

3. Apparatus according to claim 1, wherein the binding mixture pump is a variable, controlled volume pump.

* * * * *